Figure 1:
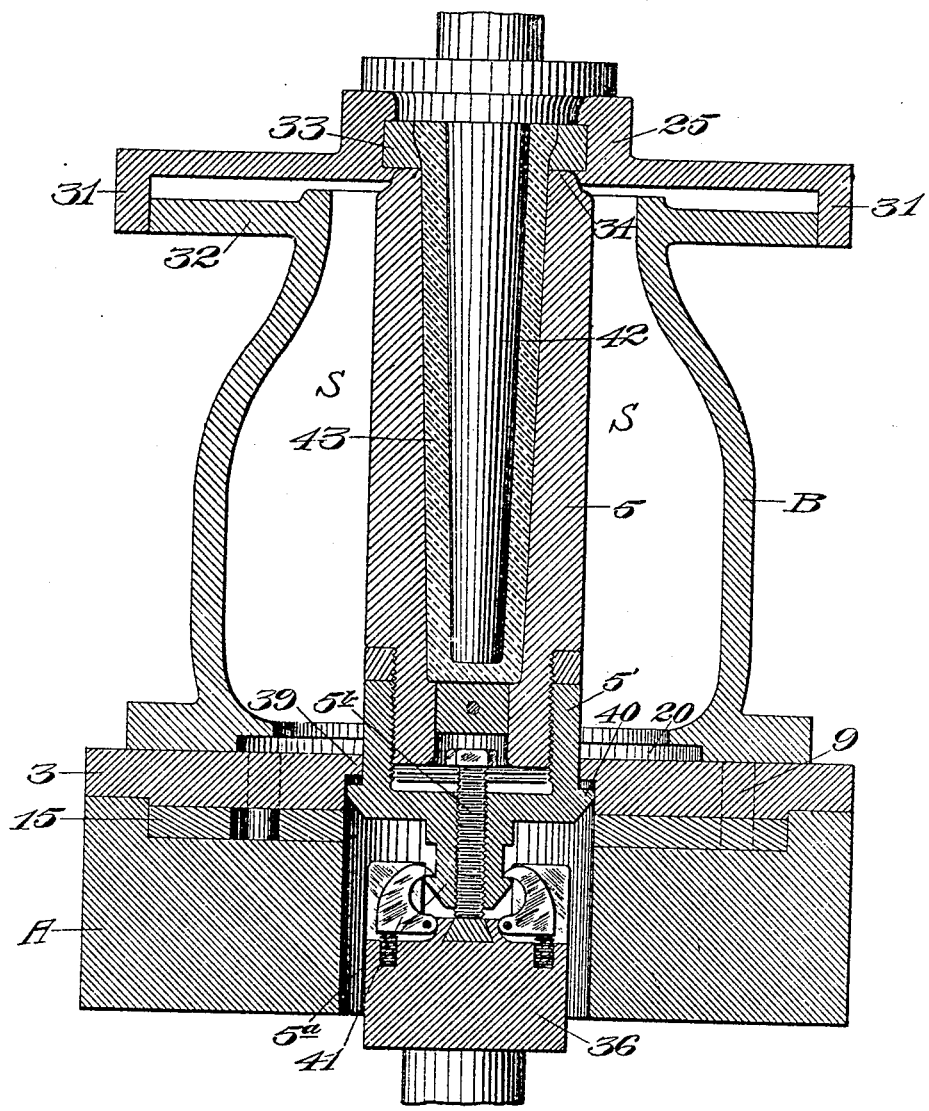

No. 817,576. PATENTED APR. 10, 1906.
F. J. MACKIN.
APPARATUS FOR MOLDING GLASS ARTICLES.
APPLICATION FILED NOV. 6, 1905.

4 SHEETS—SHEET 1.

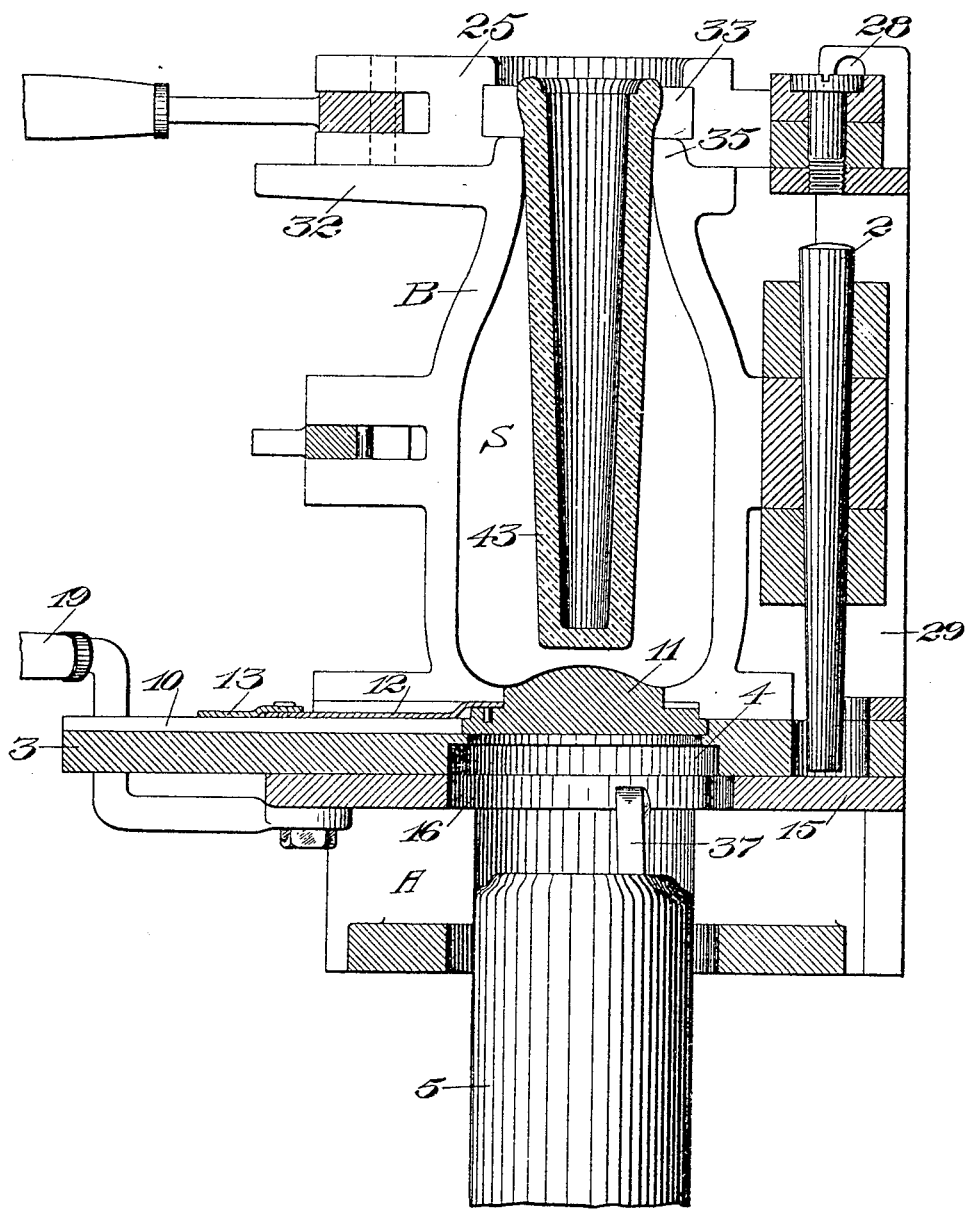

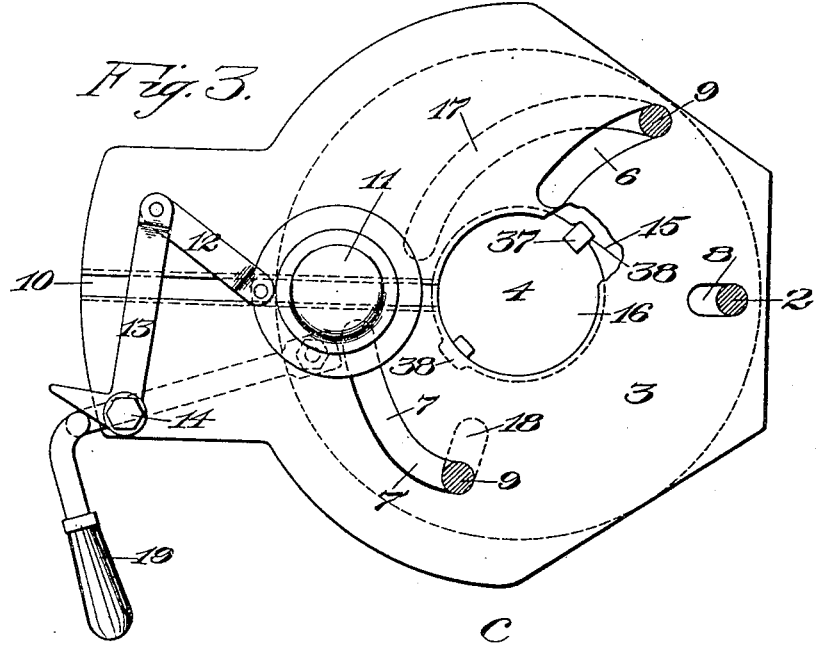

Combined machines,
Pressing & blowing,
In separate molds,
Internal press mold.

No. 817,576. PATENTED APR. 10, 1906.
F. J. MACKIN.
APPARATUS FOR MOLDING GLASS ARTICLES.
APPLICATION FILED NOV. 6, 1905.

Witnesses.

Inventor:
Francis J. Mackin
By Geo. H. Strong. Atty

*Rylands, #416,376, Dec. 3, 1889 (49-10)*
*Koepfen, #708,814, Sep. 9, 1902 (49-42)*
*Haley, #711,962, Oct. 28, 1902 (49-42)(49-9)*

UNITED STATES PATENT OFFICE.

FRANCIS JOSEPH MACKIN, OF SAN FRANCISCO, CALIFORNIA, ASSIGNOR OF TWO-THIRDS TO ILLINOIS-PACIFIC GLASS COMPANY, OF SAN FRANCISCO, CALIFORNIA, A CORPORATION OF CALIFORNIA.

APPARATUS FOR MOLDING GLASS ARTICLES.

No. 817,576.        Specification of Letters Patent.        Patented April 10, 1906.

Application filed November 6, 1905. Serial No. 286,007.

*To all whom it may concern:*

Be it known that I, FRANCIS JOSEPH MACKIN, a citizen of the United States, residing in the city and county of San Francisco and State of California, have invented new and useful Improvements in Apparatus for Molding Glass Articles, of which the following is a specification.

My invention relates to an apparatus for molding glass articles, and especially hollow articles, such as jars, bottles, and the like.

The object of my invention is to provide a simple practical machine of large capacity for shaping molten glass by fluid-pressure means in which both the mold-sections may be operated to open and close by a single lever; by which the same lever is made to close the bottom of the mold; by which one section is moved to open at a different time and at a different rate of speed from the other section, and by which the sections are shifted on their pivots, both operations being for the purpose of freeing the hot mold entirely from the glass and preventing breakage of the latter; in which machine the molds are locked automatically when closed; in which the neck-ring holder is entirely independent of and detached from the mold, whereby either may be taken out or changed without disturbing the other and whereby the blank may be held in position by the neck-ring holder when the mold is open; in which suitable and novel centering means are provided for centering the neck-ring holder relative to the mold-sections and to the opening in the bottom-plate, and in which machine novel means are provided for holding up the blank-former during the operation of forming the blank.

The invention consists of the parts and the construction and combination of parts, as hereinafter more fully described and claimed, having reference to the accompanying drawings, in which—

Figure 1 is a section on the line C C of Fig. 4 with the mold open, the neck-ring closed, and the blank-former lifted. Fig. 2 is a section on line D D of same figure, taken between the mold-sections, with the mold closed and the blank ready for blowing. Fig. 3 is a section on line F F of Fig. 5, being a plan of base-plate. Fig. 4 is a plan view of the apparatus with the mold open. Fig. 5 is a side elevation of the apparatus with the mold closed. Fig. 6 shows the locking mechanism of the two mold-sections.

A represents a suitable table or base supporting the operating parts of my invention.

B is a mold of suitable shape and size and preferably made in two complementary hinged sections which are turnable about the removable pivot pin or post 2.

Removably secured to the base is a bottom plate 3, having a central opening 4 for the blank-former 5 to operate through. This plate has three slots 6 7 8. Slots 6 7 are eccentric to hole 4, with one slot on either side of the hole to receive a corresponding vertical projection 9 on a mold-section. Slot 8 is disposed behind and radial of opening 4 and between slots 6 7 and accommodates and guides the lower projecting end of the pin or post 2, to which the mold-sections are removably hinged. The plate 3 has a radial groove 10 intersecting hole 4 and arranged in line with slot 8, and a loose cover-plate 11 for hole 4 has a lug to run in this groove and is reciprocal along the groove by suitable means, as the link 12 and the bell-crank lever 13, pivoted to plate 3 at 14.

Suitably housed beneath the bottom plate 3 is a slotted disk 15, having an opening 16, registering with hole 4 and provided with two eccentric cam-slots 17 18, in which the lower ends of the projections 9 on the mold-sections engage. The disk is provided with a handle 19 and is mounted and supported to turn about a fixed vertical axis. By operating the handle 19 in one direction the disk is rotated to close both sections of the mold. The mold is opened by operating the handle in the opposite direction. The movements, however, of the sections are not simultaneous, since in opening the mold after the article has been blown it is desirable on account of the highly-heated condition of the mold and the frangible character of the freshly-molded glass to start one section away from the glass a little before the other, then open the other section, and finally shift the whole mold backward out of all possible contact with the glass article, which is left standing on the cover-plate 11. This opening of the sections successively and the backward shift of the mold in the present instance is done, respectively, by the engagement of the projections 9 with slots 6 17 7 18 and of the pins 2 with slot 8, when the disk 15 is turned in the opening direction. As here shown, the mold-section on the right has an initial opening movement in advance of the other section. This is accomplished by suitable differences in shape and pitch of slots 7 18 and 6 17. Slot 18, it is noted, is short and is only slightly inclined from a line radial to hole 16 and is nearly at right angles to slot 7, so that projection 9 is acted on quickly and positively to move its section of the mold on the slightest turning of the disk. On the other hand, slots 6 17 are longer and are on flatter arcs and are inclined only slightly to each other, so that the initial opening movement of its corresponding mold-section begins after the disk is started to turn and continues gradually. Again, it is to be noted that the slot 7 is turned rather abruptly at its rear end, as indicated at 7', which has the effect of pushing the projection 9 backward when the mold is nearly open, and so shoving the whole mold backward on the bottom plate, the slot 8 permitting this and also guiding the mold in its backward and forward movements.

The cover 11 for hole 4 is of a diameter corresponding to the inside of the closed mold and is of a shape corresponding to the desired shape of the bottom of the article to be made.

With the mold open and the cover 11 drawn out to uncover hole 4 the short arm of the lever 13 is projected across the path of lever 19. When lever 19 is turned to close the mold, it first engages this projecting arm and pushes the cover inward over hole 4. On completely closing the mold the cover is automatically centered in place by the mold-sections, which have annular grooves 20 to receive the peripheral edge of the cover and form a tight joint.

The mold-sections S are locked automatically by the latch 21, which is pivoted to one section and has a heel portion 22 and an adjacent hook part 23 to engage a keeper or pin 24 on the other section. As the sections are brought together the pin 24' hits the heel 22 and turns the latch to throw the hook around behind the pin and prevent the sections moving apart until the latch is turned by hand or otherwise to release the hook from the pin.

The neck-ring holder 25, which is supported entirely independent of the mold, is made in two sections, each turnable independently and horizontally about its pivot 26 on the carriage 27. The latter is pivotally supported to turn vertically in the slots 28 in the fixed standards 29. The slots 28 allow the carriage to have a limited up-and-down movement. Set-screws 30 in the ends of the carriage coöperate with the standards 29 to hold the neck-ring holder horizontal without any additional support, so as to let the mold-section S open and close readily. These screws 30 also operate as stops to limit the upward and backward movement of the holder and support the latter when it is lifted and turned back to enable the mold to be taken out. The mold simply rests by gravity on the bottom plate 3 and is held in place and guided entirely by means of the projections 9, pin 2, and their respective slots.

The neck-ring-holder sections have each a dependent stop and centering-flange 31, between which flanges when the holder is closed and resting horizontally the mold-sections are movable. The mold-sections have corresponding lateral projections 32, which abut against the flanges 31 when the mold is opened to its fullest extent, the flanges having the double function of limiting the open movement of the mold and of insuring the centering of the neck-ring opening with the hole 4 in the bottom plate. Each section of the holder carries a section of the neck-ring 33, by which the mouth of the bottle or jar or other article is formed. The sections of the holder are locked together by a suitable latch 33', carried by one of the handles 33$^a$ and adapted to engage a corresponding keeper on the opposed section.

The neck-ring when closed forms with its holder an annular recess 34 for the annular projection 35 on the top of the mold when the mold is closed.

With the cover 11 in place, the mold closed, and the neck-ring holder closed and dropped in the slots 28 to rest on the mold and fit over the projection 35, the plastic-glass blank, which is suspended from the neck-ring in the manner to be described, may be expanded in the mold to form the article desired.

The blank is made by the following means: The blank-former 5 is a hollow cylinder open at the top and is generally of ordinary construction, except that its socket 5' and stud 5$^a$ carry an adjusting-screw 5$^b$, which may be turned to project more or less beyond the stud to bear on the clutch-head 36, which is supported below the bottom plate. The former is adapted to be projected through the openings in the bottom plate 3 and disk 15 up into the mold either by the clutch-head 36 or by any other appropriate means. With the mold open and the cover 11 drawn out from over the hole 4 the former may be projected upward through the hole and against the bottom of the neck-ring and held in elevated position by the dogs 37. The latter are pivoted in slots in the base A and normally operate by gravity to extend into the path of the former either to engage below the former and hold it up or to prevent its being raised. When the disk 15 is turned to open full the mold, then the dogs may be pushed back into the slots or notches 38 in the disk and out of the path of the former. Turning the disk will throw the upper ends of the dogs outward to afford the stops described. The bottom plate 3 around hole 4 has an annular ledge 39, against which the lugs or flanges 40 on the lower end of the socket part of the former abut to limit the upward movement of the former. The clutch-head 36 is slotted and has the usual grippers 41 to engage the shoulders on the stud $5^a$ of the former to retract the latter when it is desired to withdraw the former from the mold after forming the blank. Any suitable means may be employed to reciprocate the clutch-head 36; but as the latter forms no essential part of my invention such means are not here shown. In fact, the support A is generally mounted to rotate so as to move the molds successively into different positions at different moments where the various operations take place of receiving the gather, forming the blank, expanding the same, and opening the mold to discharge the finished article.
The blank-former is usually raised by a device called the "kicker," while the clutch-head is mounted on a stationary support and is for the purpose simply of pushing the former up against the neck-ring during the time that the gather is being pressed into the form of the blank and then to retract the former, leaving the blank suspended by the neck-ring; but inasmuch as movable tables and kickers are well known in the art and form no part of the present invention their illustration or further description here are not considered necessary.

In practice the operation of my invention is as follows: The neck-ring holder is closed and is supported in a horizontal position slightly above the top of the mold, so that the mold-sections may turn freely, the holder being supported on the standards 29 by means of the pivots on the carriage 27 and the screws 30. With the mold-sections opened and engaging the flanges 31 on the closed and locked neck-ring holder 25 and with the cover 11 withdrawn from over the hole 4 the blank-former is projected up into the mold and caught and held by the dogs 37. The gatherer is then deposited through the neck-ring into the cavity in the former. The table is then moved to bring the mold to the pressing-point, when by means of the clutch-head the former is pushed up into the recess 34 and snug against the neck-ring 33, the purpose of the screw $5^b$ being to effect a suitable adjustment, so that the former will always properly engage the neck-ring, since the clutch-head has ordinarily only a uniform length of stroke. The upward movement of the clutch-head operates to press the dogs 37 back into their recesses in the disk 15 and in the support A, so that on the downward movement of the clutch-head it is able to carry the former along with it. The next step is that of reciprocating the plunger 42 to form the blank 43. The plunger 42 has the effect of expanding the plastic gather and leaving the blank capable of suspension from the neck-ring holder after the plunger and former are withdrawn. On the former and plunger being withdrawn from the mold the handle 15 is operated to close and lock the mold-sections and to inclose the blank 43, which is left suspended on the neck-ring. Preliminary to the closing of the molds the handle 15 engages the bell-crank lever 13 to push the cover 11 in over hole 4, the one operation of lever 15 serving, as before described, to move the cover and close the mold. When the mold is entirely closed the sections encircle and center the cover perfectly. By a slight movement of the handles on the neck-ring holder the latter is dropped into position on top of the mold, and then by suitable pneumatic appliances (well known in the art) the blank is expanded in the mold to form the desired article. The neck-ring holder and the mold are subsequently opened to free the article and allow of its removal, the neck-ring being opened first to release the article. As the mold-sections open out and are pushed back on their pivots 2 in slot 8 the semi-annular projections 35 on the mold-sections engage the walls of the semi-annular recesses 34 on the neck-ring holder to lift the latter in the slots 28. After the removal of the article from the open mold the neck-ring holder is closed and locked again ready for the next operation, being properly centered by the proper coöperation of the parts 31 32. With the neck-ring holder horizontally closed and locked and with the mold-sections wide open against the flanges 31 the disk 15 is in suitable position to bring its notches 38 into register with the dogs 37, so that the latter may be pushed on the up movement of a blank-former.

As before stated, one of the important features of the invention is the opening of the mold-section successively and the backward shift of the entire mold, so as to entirely free the article, leaving the latter supported alone upon the cover-plate 11. Another important feature of this invention which it is desired to emphasize is that of having the neck-ring holder entirely independent of the mold, so that either one of these parts may be removed without disturbing the other. The guides 32 and the flanges 31 insure the accurate centering of the neck-ring relative to the blank-former when the sections are opened. When the sections are closed, the centering of the ring and of the suspended blank is insured by the engagement of the annular projection 35 on the top of the mold with the annular recess 34, provided beneath the neck-ring.

By reason of the dogs 37 and the notches 38 the blank-former only passes through the opening 4 when the mold is fully opened. If it is attempted to push the former up after the mold-sections have started to close, the ring 15 will have acted to move the dogs out of the notches 38 and into the path of the former. By having the mold resting simply by gravity on its support it can be easily taken out, no matter how hot it may become.

By having the pin 2 removable the sections are easily separable, so that in case of need one section could be removed and replaced without even waiting for the other section to cool off.

It is possible that various modifications in my invention may be made without departing from the principle thereof, and I do not wish to be understood as limiting myself beyond what is required by the reasonable construction of my claims.

Having thus described my invention, what I claim, and desire to secure by Letters Patent, is—

1. In apparatus of the character described, the combination of a sectional mold, means for opening and closing the mold, means for shifting the pivot of the mold-sections coördinately with the opening of the mold, a sectional neck-ring holder, and means for supporting said holder independent of the mold.

2. An apparatus of the character described having in combination a sectional mold, means for opening and closing the mold, means for giving one mold-section an accelerated opening movement, means for shifting the pivot of the mold-sections coördinately with the opening of the mold and a sectional neck-ring holder supported independently of the mold.

3. In apparatus of the character described, a mold comprising two hinged sections and a single lever for opening and closing the sections, means for shifting the pivot of the mold-sections coördinately with the opening of the mold, and means for causing one section to begin to open slightly in advance of the other.

4. In apparatus of the character described, a mold comprising two hinged sections and a single lever for opening and closing the sections, means for shifting the pivot of the mold-sections coördinately with the opening of the mold, means for causing one section to begin to open slightly in advance of the other, and means for giving the sections an eccentric motion during their opening and closing movements.

5. In apparatus of the character described, a mold made in two hinged sections, means for opening and closing the mold, means for shifting the pivot of the mold-sections coördinately with the opening of said mold, and means for giving one section an accelerated opening movement.

6. In apparatus of the character described, a mold made in two hinged sections, a support for said sections, means for opening and closing the sections, and means for shifting the pivot of the mold on said support during the opening movement.

7. In apparatus of the character described, a sectional mold, means for closing the mold, and means for opening the sections successively and coördinately.

8. In apparatus of the character described, a sectional mold, a single lever for operating the sections to open and close the mold, and means for giving one of the sections an accelerated initial opening movement.

9. In apparatus of the character described, a mold comprising two hinged sections turnable about a common pivot, a support for said pivot, means for opening and closing the sections, and means for shifting the pivot on said support during the opening movement.

10. In apparatus of the character described, a mold comprising two hinged sections turnable about a common pivot, a support for said pivot, means for opening and closing the sections, means for shifting the pivot on said support during the opening movement, and means for giving one of the sections an initial accelerated opening movement.

11. In apparatus of the character described, the combination of pivoted mold-sections, a slotted support therefor, means for shifting the pivot of the mold-sections coördinately with the opening of the mold, a slotted disk, projections on the mold-sections engaging the slots in said support and disk, the slots and the support and disk coöperating with said projections to open or close the mold-sections on the operation of the disk, and means for operating the disk, said slots arranged so that one mold-section is given an initial opening movement in advance of another.

12. In apparatus of the character described, the combination of a slotted bottom plate, a sectional mold resting thereon by gravity and having projections engaging and guided in said slots, said mold-sections hinged together and having a pivot-pin engaging suitable guides on the bottom plate, said pivot-pin being movable in said guides to permit the mold to be shifted back and forth, and means engaging the mold projections and coöperating with the slots in the bottom plate to open and close the mold.

13. In apparatus of the character described, the combination of a bottom plate having an opening, a mold comprising two hinged sections resting on the bottom plate and adapted to close said opening, said sections having a pivot-pin engageable with guides on the bottom plate, said guides arranged radially of said opening, and means for opening and closing the mold-sections.

14. In apparatus of the character described, the combination of a bottom plate having an opening, a mold comprising two hinged sections resting on the bottom plate and adapted to close said opening, said sections having a pivot-pin engageable with guides on the bottom plate, said guides arranged radially of said opening, means for opening and closing the mold, and means for moving the mold along said guides coördinately with the opening movement of the sections.

15. In apparatus of the character described, the combination of a bottom plate having an opening, a mold comprising two hinged sections supported on said plate and adapted to inclose the opening, means for opening and closing the mold-sections, and means for moving the mold to and from the opening coördinately with the closing and opening of the mold.

16. In apparatus of the character described, the combination of a bottom plate having an opening, a mold comprising coöperating hinged sections adapted to inclose said opening, means for opening and closing the mold, and means for moving the mold away from said opening in the bottom plate when the mold is open.

17. In apparatus of the character described, the combination of a bottom plate having an opening, a mold comprising hinged sections adapted to inclose said opening, means for opening and closing said mold and for giving one of the sections an initial opening movement in advance of the other, and means for shifting the pivot of the sections relative to the opening in the bottom plate when the mold is open.

18. In apparatus of the character described, the combination of a sectional mold comprising hinged sections, a slotted bottom plate having an opening within the mold, a slotted disk coaxial with said opening, projections on the mold-sections engaging the slots in the plate and disk, means for rotating the disk to open and close the mold, and means for shifting the pivot of the mold-sections coördinately with the opening of the mold.

19. In apparatus of the character described, the combination of a sectional mold comprising hinged sections, a slotted bottom plate having an opening within the mold, a slotted disk coaxial with said opening, projections on the mold-sections engaging the slots in the plate and disk, means for rotating the disk to open and close the mold, means for shifting the pivot of the mold-sections coördinately with the opening of the mold, and means for giving one mold-section an initial opening movement in advance of the other.

20. In apparatus of the character described, the combination of a bottom plate having an opening, a sectional mold surrounding the opening, means for opening and closing the mold, a cover for the bottom opening, and means for operating the cover coördinately with the closing of the mold.

21. In apparatus of the character described, the combination of a bottom plate having an opening, a sectional mold surrounding the opening, means for opening and closing the mold, a blank-former reciprocal in said opening, pivoted dogs to support said former within the mold, and a clutch-head for releasing said dogs and for withdrawing the former from the mold.

22. In apparatus of the character described, the combination of a bottom plate having an opening, a sectional mold surrounding the opening, means for opening and closing the mold, a blank-former reciprocal in said opening, pivoted dogs to support said former within the mold, and a clutch-head for releasing said dogs and for withdrawing the former from the mold, said former provided with an adjusting-screw to bear on the clutch-head and regulate the upward movement of the former by the clutch-head.

23. In apparatus of the character described, the combination of a bottom plate having an opening, a sectional mold inclosing said opening, a rotatable disk, said plate and disk having slots, projections on the mold-sections coöperating with the slots to open and close the mold on the rotation of the disk, a blank-former reciprocal through the opening in the disk and bottom plate, and pivoted dogs arranged in the path of the former, said disk having notches to accommodate the dogs to permit the former to pass through said opening.

24. In apparatus of the character described, the combination of a mold and a sectional neck-ring holder supported independent of the mold, said neck-ring holder turnable in a vertical plane, and the sections thereof hinged to turn in planes at right angles to a vertical plane.

25. In apparatus of the character described, the combination of a mold and a neck-ring holder coöperating therewith, said neck-ring holder being supported independent of the mold and hinged to turn in a vertical plane, and a support for the mold on which the latter rests by gravity, said mold being removable independent of the neck-ring holder.

26. In apparatus of the character described, the combination of a bottom plate having an opening, a sectional mold supported on the plate and inclosing the opening, means for operating the mold, a cover for said opening operable by the mold-closing means, a blank-former reciprocal through said opening, and an independently-supported hinged neck-ring holder coöperating with the mold and former.

27. In apparatus of the character described, the combination of a bottom plate having an opening, a sectional mold supported on said bottom plate and inclosing said opening, a closure for the latter, means for operating the mold, a blank-former, a sectional neck-ring holder, and an oscillating carriage on which the holder is pivoted.

28. In apparatus of the character described, the combination with a suitably-supported mold, and means for operating the mold, of a neck-ring holder, a carriage to which the sections of the neck-ring holder are pivoted, slotted supports for said carriage in which the latter has a limited reciprocating and oscillating movement.

29. A mold comprising two coöperating hinged members, a supporting-plate therefor, means coöperating with the plate to open and close the mold, a neck-ring and neck-ring holder, latch mechanism carried by one of the mold-sections, and means on the other section coöperating with said latch mechanism to actuate the latter and lock the sections on the closing of the mold.

In testimony whereof I have hereunto set my hand in presence of two subscribing witnesses.

FRANCIS JOSEPH MACKIN.

Witnesses:
D. B. RICHARDS,
J. RAPHAEL.